United States Patent Office 2,855,191
Patented Oct. 7, 1958

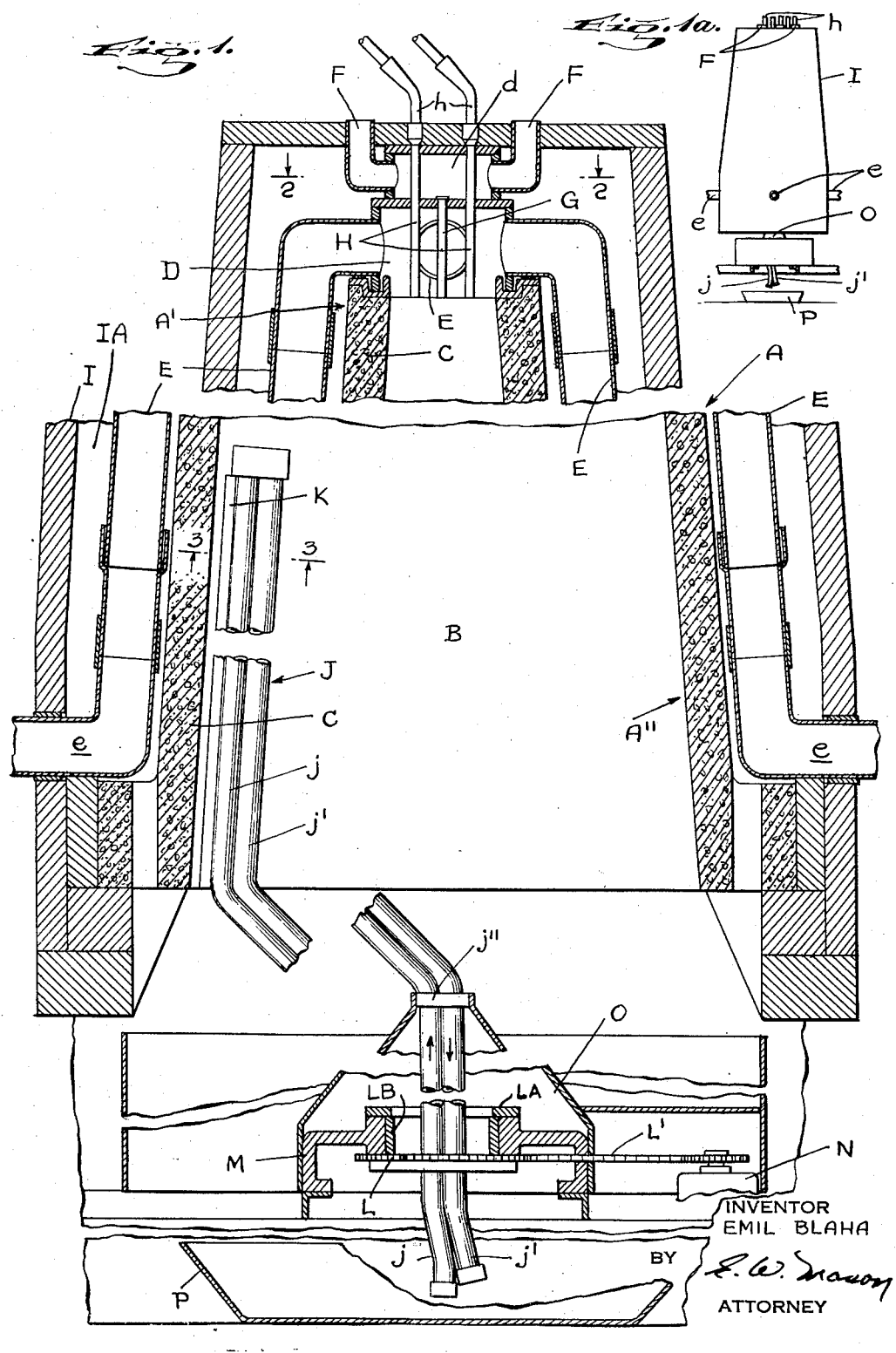

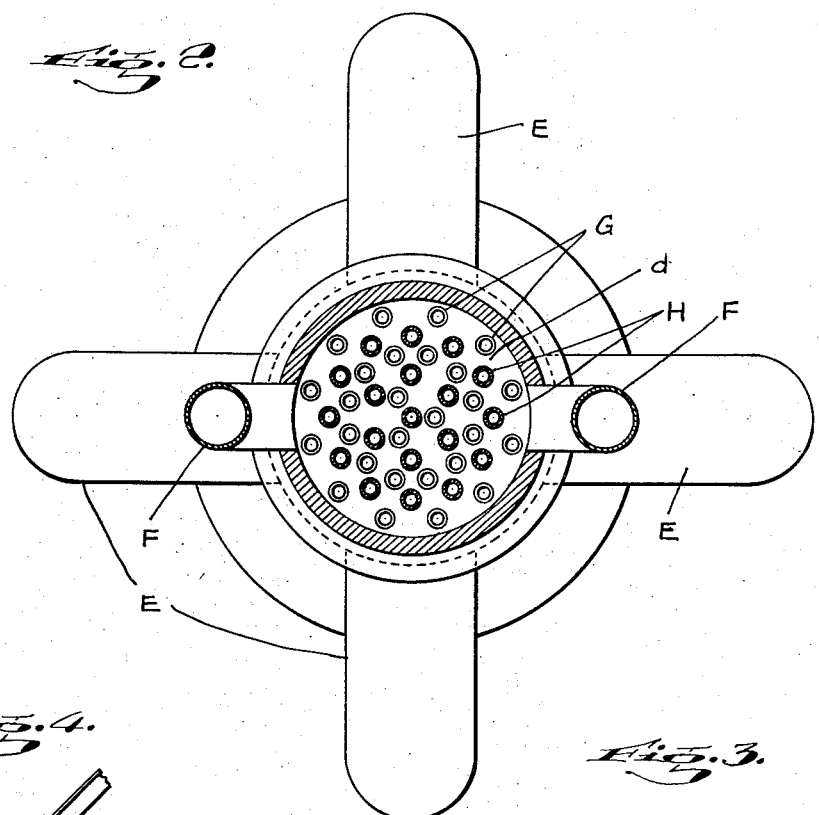
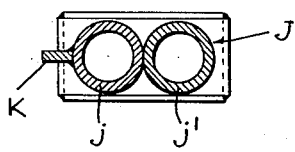
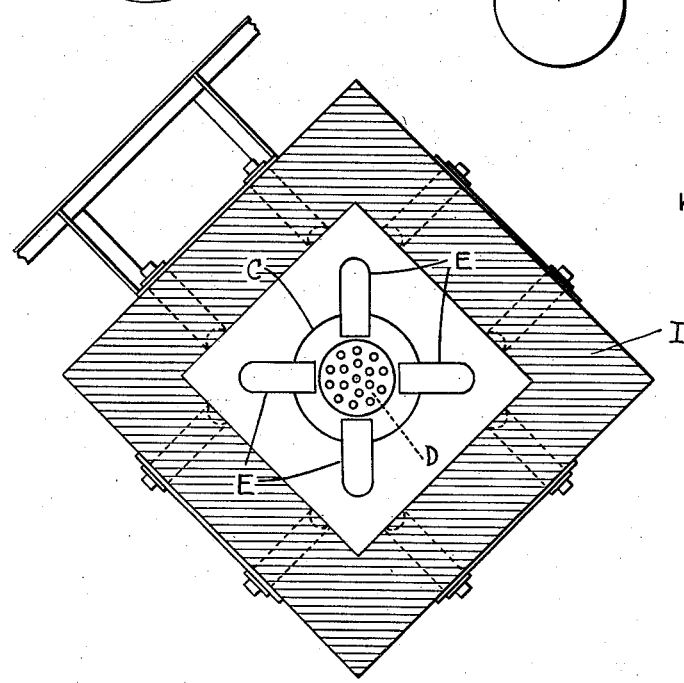

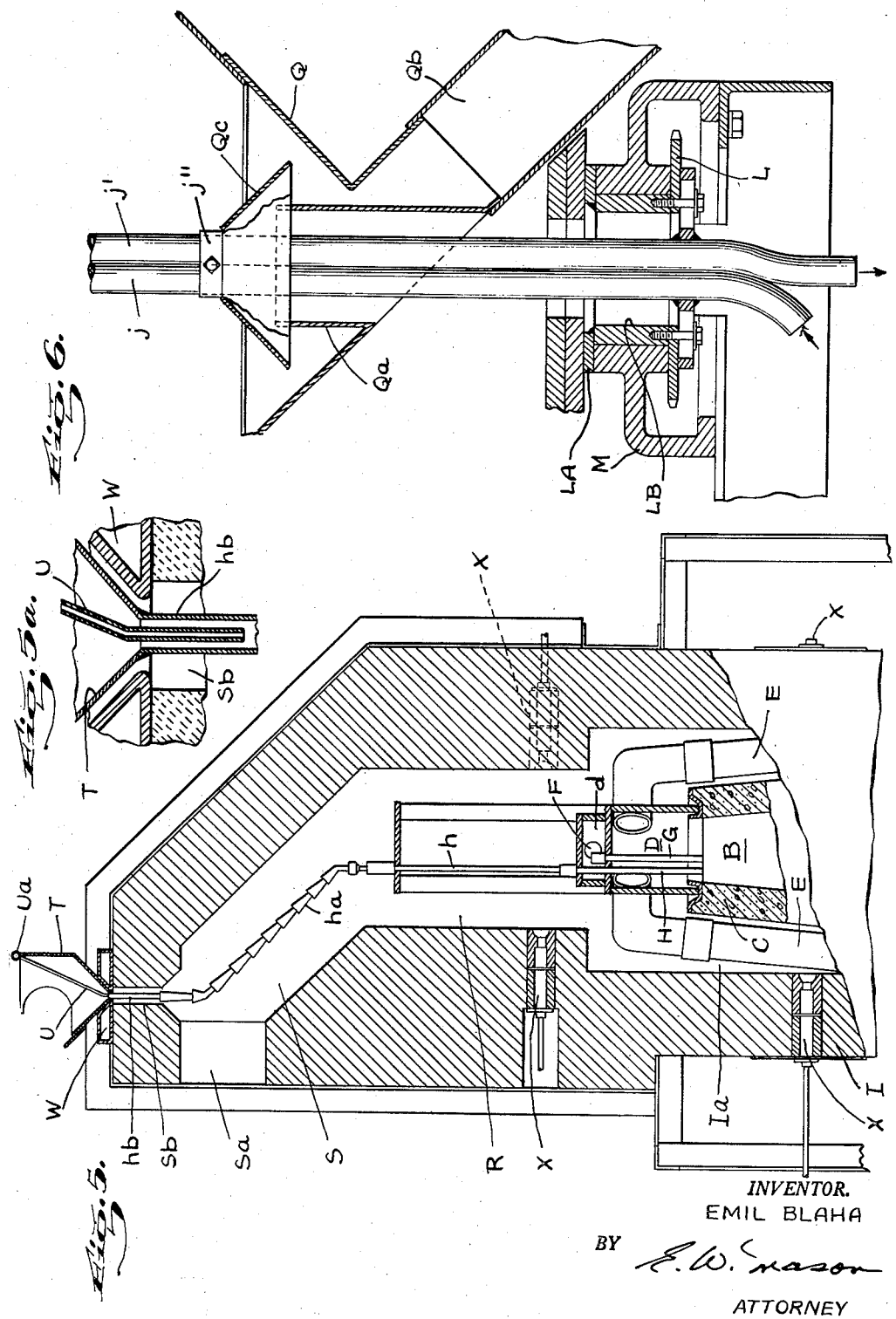

2,855,191

APPARATUS FOR CONVERTING CLAY PARTICLES INTO FUSED UNICELLULAR SPHERICAL BODIES

Emil Blaha, Cheltenham, Pa., assignor to Selas Corporation of America, Philadelphia, Pa., a corporation of Pennsylvania Application May 19, 1954, Serial No. 430,805

3 Claims. (Cl. 263—21)

The general object of the present invention is to provide novel and effective apparatus for converting small clay particles into hollow fired, i. e. fused, bodies of unicellular spherical form, by fusing the particles at a temperature in the range of 2500° F.–3500° F. Small hollow bodies so formed may be used with advantage as constituents of larger fired bodies, such as bricks.

The inclusion of such hollow bodies in a brick to be fired, results in the production of a light weight brick. The weight of a brick so formed may well be not more than about 50% of the weight of a brick having the same dimensions but formed and fired in the customary manner. The small hollow bodies formed as above described, may also be used as insulation material and for other purposes. The size of the particles formed may vary as operating conditions are varied, but ordinarily each such hallow body will have a diameter not greater than about ⅛ of an inch.

The apparatus used in the production of fused hollow spherical bodies in accordance with the present invention, may take various forms, two of which are illustrated and described in some detail hereinafter, and includes furnaces which may vary widely in dimensions and form. In one of the two forms of the invention illustrated herein, the clay particles are preheated to a temperature in excess of about 1400° F., which is the cracking temperature of the fuel gas used, but is lower than the minimum temperature of about 2500° F. at which the spherical bodies fuse. In another form of the invention illustrated, the clay particles are not preheated to a significant extent prior to their passage into the furnace chamber in which the clay particles are heated to a fusing temperature. In both forms of the invention illustrated, preheated fuel gas and combustion air are passed into the upper end of the furnace chamber space at substantially the same level at which the clay particles pass into said space and first make contact with the main fuel gas and combustion air supplies.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is an elevation, with portions broken away, of one desirable form of the present invention;

Fig. 1a is a small scale drawing of the complete furnace shown in part in Fig. 1 with portions broken away;

Fig. 2 is a cross section on the line 2—2 of Fig. 1;

Fig. 3 is a cross section on the line 3—3 of Fig. 1;

Fig. 4 is a plan view partly in section of the furnace structure shown in Fig. 1;

Fig. 5 is a sectional elevation of a modification of the apparatus shown in Figs. 1 to 4 including a preheating space above the furnace proper in which the gas and clay particles are heated to the gas cracking temperature;

Fig. 5a is an enlarged reproduction of a portion of Fig. 5; and

Fig. 6 is a vertical section through the lower portion of the furnace shown in Figs. 1 to 4, illustrating a modification of the means for collecting the finished hollow fused bodies.

In the drawings, Fig. 1 illustrates upper and lower sections A' and A" of a vertically elongated, conical furnace A, which is shown somewhat diagrammatically and on a smaller scale in Fig. 1a. The furnace A comprises a furnace chamber B surrounded by a refractory furnace wall C. As shown in Fig. 1, the upper end of the wall C supports the annular bottom portion of a box-like structure D into which preheated combustion air is passed through the upper ends of conduits E. As shown in Fig. 4, there are four conduits E symmetrically disposed about the axis of the furnace A. The upper end wall of the structure D forms the botom wall of a chamber d. The latter receives fuel gas through conduits F.

Gas is passed from the chamber d down to the upper end of the chamber B through tubes G which have their upper ends opening into the chamber B at the bottom of the chamber d. Clay particles to be converted into fused hollow spheres, are fed into the upper end of the chamber B through feed tubes H which extend verically through the chambers D and d and have their lower ends flush with the lower ends of the tubes G. Only one tube G and two tubes H are shown in Fig. 1, but ordinarily there are a multiplicity of parallel tubes G and H in each furnace unit. The tubes G and H in each furnace will ordinarily vary in number with the cross sectional area and operating capacity of the associated furnace. Thus as shown in Fig. 2, there are twenty-seven gas supply tubes G and nineteen clay feed tubes H opening into the upper end of the subjacent furnace chamber B, the tubes or pipes G and H being all parallel and symmetrically disposed relative to one another. By way of illustration and example, it is noted that the internal diameter of the upper end of the particular furnace wall C shown in Figs. 1 and 2, is eight inches, and the vertical extent of the chamber B is ten feet. It is to be noted further, that the invention may be used in furnace units much larger than those mentioned.

As shown, the combustion air supply pipes E are metal tubes each comprising a plurality of aligned, vertically disposed, sections desirably connected in such manner as to maintain tight joints between the abutting sections notwithstanding the relative contraction and expansion of said sections as their temperatures vary. As shown, each conduit E has an out-turned lower end portion connected to a pipe e supplying preheated combustion air to the corresponding tube E. The vertical and upper end portions of the tubes E are protected against undesirable cooling action by an outer wall I which surrounds a vertically elongated space IA surrounding the furnace C and through which the tubes E extend. As shown in Fig. 4, the wall I is rectangular in cross section and may well be a brick wall.

The tubes or pipes H with their inclined upper end extensions h, have an internal diameter substantially larger than the maximum diameter of the clay particles which pass by gravity through said tubes into the upper end of the chamber B. In the constructions shown in Figs. 1 and 2, the fuel gas passes through the pipes F into the chamber d, and thence through the pipes G into the furnace chamber B. The gas thus passing through the pipes G, and the clay particles passing through the portions of the pipe H extending through the chamber D, are subjected to a substantial heating effect by the preheated air passed into the chamber D through the pipes E. A characteristic feature of the invention is that the combustion air supplied by the conduits E, the fuel gas passing from the chamber d downward through the pipes G, and the clay particles to be heated and expanded which pass down through the tubes H, all come into initial contact with one another at and immediately below the common level of the lower ends of the tubes G and H.

As the clay particles pass downward through the chamber B, they are heated to, and usually above, the fusion temperature of 2500° F. and pass through a tacky stage and some of the bodies engage and adhere to the inner wall of the chamber B. Permanent adherence to the furnace wall of clay particles or, more accurately, of the hollow fused bodies into which the clay particles are converted, is obviously objectionable. Such permanent adherence may advantageously be avoided by the use of a scraper such as the scraper element J shown in Fig. 1. The element J comprises two side-by-side water cooled tubes $j$ and $j'$ having their upper ends connected for flow of water from the tube $j$ into the tube $j'$. The tubes $j$ and $j'$ are also mechanically connected adjacent their lower ends, by a member $j''$, and by a sprocket wheel L. In operation, relatively cold water is passed into the lower end of the pipe $j$, and the water, heated as it passes through the tubes $j$ and $j'$, is discharged at the lower end of the tube $j'$. Any usual or suitable means may be employed to supply water to the lower end of the pipe $j$ and to remove water from the lower end of the pipe $j'$. As shown in Fig. 1, the connected upper ends of the pipes $j$ and $j'$ are located at an intermediate level in the chamber B. In some cases, the upper end of the element J may well be located about midway between the upper and lower ends of the chamber B.

As shown, the tubes $j$ of the element J are provided with a scraper rib K which extends radially away from the axis of the chamber B into engagement with the inner surface of the wall C. The element J includes a vertical lower end section below the central portion of the lower end of the chamber B which is connected by an inclined intermediate section of the element J to the scraper section of said element. The centrally disposed lower section of the element J extends through and is secured to the rotatable sprocket wheel L. The latter is supported by a stationary structure M some distance below the lower end of the chamber B. As shown, the wheel L is suspended from the upper portion of the member M by a rotatable annular upper plate LA and a depending tubular connector LB. In normal operation, the sprocket wheel L is rotated by a sprocket chain L' looped about the sprocket wheel, and also looped about a smaller sprocket wheel carried by the shaft of an electric motor N as shown in Fig. 1.

In the construction shown in Fig. 1, the sprocket wheel L, chain L' and motor N are covered by a metallic shield O which prevents the impingement against the enclosed parts of the expanded hollow spheres passing downward through the furnace chamber and collected in a receiver P beneath the cover members L, L' and M, as shown in Fig. 1. However, the receiving means for the hollow spheres passing downward out of the chamber B may take various other forms. One of those forms is shown in Fig. 6. In that Fig., the receiver pan P is replaced by a hopper Q above the sprocket wheel supporting structure M. The hopper Q is formed adjacent its lower end with an uprising, open ended, tubular member Qa coaxial with the structure M and chamber B, and through which pass vertical portions of the tubes $j$ and $j'$ extending upward from the sprocket wheel L. The upper end of the tubular part Qa extends into, but does not engage, the lower end of a cone Qc which surrounds and is secured to the pipes $j$ and $j'$. The cone Qc deflects downwardly falling hollow spheres away from the tubular part Qa and into the tubular outlet portion Qb of the hopper Q. The outlet portion Qb is inclined downward and outward from the central bottom portion of the hopper Q and serves as a chute for discharging the hollow spheres into a receiver, not shown, which may be laterally displaced to one side of the superposed furnace chamber B. The sprocket wheel L of Fig. 6 may be driven through a chain L' by a motor N, as is the sprocket wheel L shown in Fig. 1.

In the modification shown in Fig. 5, the upper end portion Ia of the wall I is extended to provide a vertical space R directly above the upper end of the conical surface of the wall C, and an inclined space S above the space R. The lower end of the space S is in free communication with the upper end of the space R. The upper end of the space S opens to the atmosphere through a lateral port Sa. A vertical opening Sb in the horizontal upper end portion of the wall I, forms a passage for the inlet end portions of the vertical pipe sections hb, which are connected to the vertical tubes H by inclined tubes ha and vertical tubes h. Each pipe hb receives clay particles from the lower end portion of a hopper T, and receives raw fuel gas through a pipe U from a gas supply pipe Ua. While only one pipe H with its extensions h, ha and hb is shown in Fig. 5, there are a multiplicity of pipes H in Fig. 5, as in the arrangement shown in Fig. 2. The number of pipes H in the construction shown in Fig. 5, will vary with the dimensions of the associated furnace chamber B, as in the Fig. 2 arrangement. The various tubes U of the unit may be arranged side-by-side in a single horizontal row.

The modification shown by Figs. 5 and 5a is designed for use in heating the clay particles, before they pass into the furnace chamber B, to a temperature which is below the fusion temperature of about 2500° F., but is advantageously in excess of the fuel gas cracking temperature of about 1400° F. To this end it is necessary to heat the spaces R and S so as to thereby heat the clay particles and raw gas passing through the pipes or tubes hb, ha and h.

As is clearly shown in Fig. 5a, each branch pipe U of the gas main Ua, has an external diameter substantially smaller than the internal diameter of the corresponding pipe hb, so that the clay particles can pass freely through the annular space between the tubes U and hb. As shown, the lower end of each pipe U is centrally disposed in the corresponding pipe hb. The clay particles to be converted into hollow spheres may be fed into the hopper T in any suitable and convenient manner. In some cases, the clay particles may advantageously be fed into the hopper by a rotary conveyor, and in some cases, the hopper chamber may be closed in normal operation. In other cases the upper end of the hopper T may be open at all times. The substantial velocity with which the gas supplied to the main Ua passes down through each pipe U into the corresponding pipe hb, coupled with the continuous downflow of clay particles from the hopper T into each pipe hb, effectively eliminates any tendency for the gas injected into each pipe hb through the corresponding pipe U, to reverse its flow direction and pass upwardly into the hopper T. As will be apparent, the clay material flowing down through the pipe hb acts as a sort of a pump tending to move the raw gas downward into the furnace, even when the upper end of the hopper T is in free communication with the atmosphere.

As the raw gas moves down through each tube hb, the immediately subjacent row of end-to-end tubes ha, and each associated tube h and H, the gas is heated to a cracking temperature. One effect of thus cracking the gas, is the liberation of hydrogen and carbon monoxide, each of which will burn with a hotter flame than is ordinarily obtainable with fuel gas burned in the customary manner. The cracking of the fuel gas moving down toward the furnace, results in the formation of small carbon elements which engage and adhere to the associated carbon particles. The combustion of the last mentioned particles increase the temperature of those particles and of the gaseous stream enveloping them. Each of the end-to-end series of tubes ha is a hollow tapered, or conical, tubular member. The upper end of each lower member *ha* receives the lower end of the tube member *ha* immediately above it. The use of the tubes *ha* facilitates the assembly of pipe sections which may be formed of cones of different lengths and also permits the easy and rapid disassembly of the elements *ha* if and when the clay particles lodge in any portion of the conduit section formed by an end-to-end group of tube elements *ha*.

My invention includes a number of novel and practically important characteristics, one of which is the simple and effective manner in which combustion initiated at the upper end of the furnace chamber B proceeds as the burning gases and products of combustion move downward in the chamber B. Another is the effective use made of the products of combustion passing away from the lower end of the furnace chamber B into the space Ia through which the combustion air passes through the tubes E and thus increases the temperature of the preheated air passing through the tubes E. The products of combustion passing out of the furnace chamber B at its lower end are at a temperature which is too high for passage into the lower end of the space IA, and is advantageously reduced by the admixture with said products of atmospheric air. For this purpose the outer wall I is shown in Fig. 1 as having its lower end at a level below the lower end of the chamber B, and the lower end of the chamber Ia open to the enveloping atmosphere. In consequence, atmospheric air is drawn into admixture with the furnace gases drawn upward through the space Ia by stack suction. The amount of products of combustion discharged at the lower end of the chamber B, is dependent on and regulated by the amounts of fluid passed into the upper ends of the furnace through the pipes E, G and H. In practice, the amount of atmospheric air drawn into the lower end of the space Ia will depend upon and vary with the throttling effect of the port Sa of Fig. 5, and restricted outlet passages which may be formed in the upper end portion of the wall I of Fig. 1.

Another important characteristic of the invention is the provision of the scraper element J by which expanding spheres at fusion temperatures are prevented from permanently adhering to the furnace wall surrounding the furnace chamber B, without requiring special provisions for controlling the direction of down movement of the expanding particles to keep them out of contact with the furnace wall while at the fusion temperature.

The modification shown in Figs. 5 and 5a possesses the general advantages of the apparatus shown in Fig. 1, and in addition has the advantage of preheating the clay particles up to a temperature which may well be nearly as great as the temperature at which the clay particles will fuse, before the passage of the particles into the furnace proper. As shown and described, the means for passing raw gas into the tubes *hb, ha*, etc., through which the clay particles are fed into the furnace chamber, is simple, and requires only a moderate fuel gas supply pressure. In practice, as the clay particles and raw gas move down through the pipe sections *hb, ha, h* and H, the heat transfer conditions are such that the clay particles and the raw gas received from the main Ua, rapidly heat up to a temperature equal to or above the gas cracking temperature. As has been explained, the cracking of the gas augments the temperature of the clay particles, and of the gas, attained in passing to the upper end of the furnace chamber B.

The relative amounts of gas supplied through the main Ua and its branches U, and the gas supplied through the pipes F, may vary through a wide range. As indicated, however, by the foregoing explanations, the greater the ratio of the gas supplied through the pipes U, *hb*, etc., to the gas supplied through the pipes G, the higher will be the temperature of the clay particles passing into the furnace chamber B through the pipes H.

In the form of the invention shown in Fig. 5, the temperature attained by the clay particles and gas moving down into the furnace through the pipes *hb* and *ha* is increased by the use of furnace wall burners which may advantageously include four burners X at a level slightly above the top of the chamber *d*, and four other burners opening into the space Ia at a level slightly below the upper end of the chamber B. In practice, the burners X may advantageously be arranged to discharge tangential jets of burning gases and products of combustion into the spaces Ia and R.

The manner in which the fuel gas and preheated combusion air are mixed and envelop the clay particles, contribute to a rapid and uniform transfer of heat to the clay particles whereby those particles are rapidly heated up to and maintain at a fusion temperature of from 2500 to 3500° F. while passing through a major portion of the length of the furnace chamber B. As a result of my observation of apparatus of the character shown in Figs. 1 and 5, it is my opinion and belief that the internal and external diameters of the hollow fused spheres formed in the upper portion of the chamber B, continue to increase in size throughout the duration of the period in which each sphere is maintained at the fusion temperature. The present invention relates to the same subject matter as, and is an improvement upon the heat treating apparatus for granular materials shown in Hess patent 2,502,947 that is owned by the assignee of the present application.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. Apparatus for heating small clay particles to a fusing temperature, comprising in combination, a refractory furnace wall surrounding a vertical furnace chamber, a second wall surrounding the first mentioned wall and having its lower end below the lower end of the first mentioned wall, said second wall surrounding the first mentioned wall and being separated from the latter by a vertical space having a lower inlet adjacent the lower end of said chamber and having an upper outlet above the upper end of said chamber, means for heating said chamber including conduit means for passing a combustion agent upward through said space and into the upper end of said chamber, means for passing a second combustion agent and particles to be heated into the upper end of said chamber, whereby said space serves as a chimney stack to draw products of combustion from the lower end of said chamber into and upward through said space.

2. Apparatus for heating small particles to a fusing temperature comprising in combination structure forming a furnace wall enclosing a vertically disposed furnace chamber, means forming a first space on top of said structure and in open communication with the top of said chamber, means forming a second space above and separated from said first space, a first plurality of tubes extending from said second space through said first space to said chamber and distributed across the top of said chamber and terminating at a given level, a second plurality of tubes extending through both of said spaces to said chamber and distribuated across the top of said chamber at positions in spaced relation to said first tubes and terminating at said level, means to supply air for combustion to said first space, means to supply fuel gas to said second space to flow into said chamber through said first plurality of tubes, and means to supply particles to be fused to said chamber through said second plurality of tubes.

3. The combination of claim 2 including means to surround said two spaces with hot products of combustion from said chamber.

References Cited in the file of this patent

UNITED STATES PATENTS

| | | |
|---|---|---|
| 1,924,788 | Hobson | Aug. 29, 1933 |
| 2,044,680 | Gilbert | June 16, 1936 |
| 2,502,947 | Hess | Apr. 4, 1950 |
| 2,521,190 | Stafford et al. | Sept. 5, 1950 |
| 2,676,892 | McLaughlin | Apr. 27, 1954 |
| 2,699,375 | Johannsen et al. | Jan. 1, 1955 |